(12) United States Patent
Charlton

(10) Patent No.: US 9,235,978 B1
(45) Date of Patent: Jan. 12, 2016

(54) AUTOMATED SUGGESTED ALERTS BASED ON NATURAL LANGUAGE AND USER PROFILE ANALYSIS

(71) Applicant: Domo, Inc., American Fork, UT (US)

(72) Inventor: Monty Charlton, Pleasant Grove, UT (US)

(73) Assignee: DOMO, INC., American Fork, UT (US)

( * ) Notice: Subject to any disclaimer, the term of this patent is extended or adjusted under 35 U.S.C. 154(b) by 192 days.

(21) Appl. No.: 13/949,156

(22) Filed: Jul. 23, 2013

Related U.S. Application Data

(60) Provisional application No. 61/753,382, filed on Jan. 16, 2013.

(51) Int. Cl.
| | |
|---|---|
| *G08B 5/22* | (2006.01) |
| *G08B 26/00* | (2006.01) |
| *G08B 23/00* | (2006.01) |
| *G06F 15/16* | (2006.01) |
| *G06F 15/173* | (2006.01) |
| *G06F 9/54* | (2006.01) |
| *G08B 1/08* | (2006.01) |
| *G06F 17/30* | (2006.01) |

(52) U.S. Cl.
CPC ............... *G08B 23/00* (2013.01); *G06F 9/542* (2013.01); *G06F 17/30867* (2013.01); *G08B 1/08* (2013.01); *G06F 2209/545* (2013.01)

(58) Field of Classification Search
CPC .......... G06F 17/3089; G06F 17/30864; G06F 9/542; G06T 11/206; G08B 1/08; G08B 23/00; H04L 12/1895; H04L 51/10; H04M 1/72569; H04M 2203/2072; H04W 4/12; G06Q 10/1095; G06Q 50/188
USPC ............... 340/7.58, 7.6, 7.61, 7.62, 501, 540; 709/206, 204, 217, 219, 223, 231, 224, 709/220, 228; 715/762, 763
See application file for complete search history.

(56) References Cited

U.S. PATENT DOCUMENTS

| | | | |
|---|---|---|---|
| 7,987,234 B1 * | 7/2011 | Waldorf .................... | 709/206 |
| 8,775,917 B2 * | 7/2014 | Bourke et al. ............ | 715/200 |
| 8,823,507 B1 * | 9/2014 | Touloumtzis ............ | 340/501 |
| 2009/0210510 A1 * | 8/2009 | Bouazizi .................. | 709/207 |
| 2010/0274866 A1 * | 10/2010 | Hammad et al. ......... | 709/207 |
| 2011/0148632 A1 * | 6/2011 | Chin ......................... | 340/540 |
| 2012/0011242 A1 * | 1/2012 | Suchter et al. ............ | 709/224 |
| 2014/0129661 A1 * | 5/2014 | Thyagaraja .............. | 709/207 |

* cited by examiner

*Primary Examiner* — Mirza Alam

(57) ABSTRACT

An alert suggestion generator may automatically suggest alerts for a user based on user input. The user input may include natural language text and/or user actions that the suggestion generator can use to generate alerts that have a high likelihood of relevance, and therefore desirability, to the user. Each alert may have a trigger condition such as passage of time, measurement of a numeric metric, or other factors. Each alert may also have a notification setting defining how the user is to be notified. The alert suggestion generator may retrieve a user profile of the user to further determine what alerts would be most relevant to the user. The user may be queried to confirm the alerts, and the alerts may them be set. Partial alerts may be generated and then the user may be queried for the trigger condition and/or notification setting needed to complete the alerts.

27 Claims, 7 Drawing Sheets

AUTOMATED SUGGESTED ALERTS BASED ON NATURAL LANGUAGE AND USER PROFILE ANALYSIS

CROSS-REFERENCE TO RELATED APPLICATION

The present application claims priority from U.S. Provisional Application Ser. No. 61/753,382 for "Automated Suggested Alerts Based on Natural Language and User Profile Analysis,", filed Jan. 16, 2013, which is incorporated by reference herein in its entirety.

FIELD OF THE INVENTION

The present invention relates to systems and methods for automatically generating alerts and/or notifications as well as creating alerts that a user can subscribe to.

DESCRIPTION OF THE RELATED ART

In the context of a software system, an alert (also referred to as a notification) is a form of output that presents information to a user at a given time or in response to a given trigger event, rather than output that is presented immediately in response to a user request. Possible forms of output may include emails, SMS messages, visual cues, audible tones, combinations thereof, and the like.

In many conventional systems, users can create and configure alerts; however, such a process can be inconvenient and cumbersome. For example, access to advanced features for configuring alerts may be several steps removed from a user's current action. A user may have to go through a complex series of steps to configure alerts, including choosing a data item that concerns him or her, clicking one or more menu items that allow him or her to create an alert, choosing a property of the badge that is relevant to his concern, specifying a value or threshold related to the property, and finally saving the alert.

In addition, many users may not be aware of alert configuration options; thus, difficulties in discovering alert features may be a significant hurdle to effective use. A user may first have to choose a relevant data item, select a configuration option that contains advanced properties, select the alert item from a list of advanced options, select a specific property of the badge, enter a value, and finally save the alert.

Due to the complexity of these steps, crafting alerts may be a time-consuming process that requires significant understanding of the operation of the software involved. Hence, many users may opt to forego alerts entirely. As a result, critical events or time periods may come and go without their notice.

SUMMARY

As set forth above, crafting alerts can be time-consuming, tedious, and technical. However, significant data may be gathered from the interaction of the user with a software system; this data may have the components required for the system to automatically generate alerts that have a high probability of relevance to the user. These alerts may be suggested to the user, and the user may have the simple option to either accept or reject them.

According to various embodiments, the user inputs may include one or more user actions and/or one or more natural language elements. These user inputs may be processed by an alert suggestion generator with the optional assistance of a natural language processor to extract trigger conditions that can form the basis of alerts relevant to the user. Suggested alerts may be generated based on the trigger conditions.

Optionally, user-specific user profiles may be used to enhance the relevance of the alerts generated. Each user profile may include data such as use preferences desired by the user, user relationships that are individuals, entities, documents, and/or resources to which the user is connected, and/or demographic data for the user. The alert suggestion generator may retrieve the user profile for the applicable user and apply the user-specific data from the user profile to facilitate generation of the suggested alerts.

The suggested alerts may be presented to the user along with a query that enables the user to confirm or reject the suggested alerts. The alert suggestion generator may obtain enough information to generate a partial suggested alert. Optionally, the partial suggested alert may be suggested to the user along with a query for the information needed to complete the alert.

Confirmed alerts may be set in applicable computing system, which may then monitor the trigger source of the trigger condition for each alert, and notify the user when the trigger source exceeds, equals, or descends below the trigger value. The user may be notified according to notification settings that specify the manner in which the user is to be made aware that the alert has been triggered.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

For illustrative purposes, the methods described and depicted herein refer to automated suggestion of alerts pertinent to the user inputs provided by the user of a computing system. The alerts may, in some embodiments, relate to the operation of an enterprise to which the user inputs pertain. The user inputs may be activities initiated by the user and/or natural language text provided by the user. Alerts may be suggested by processing these inputs to create alerts that, based on the inputs, have a high likelihood of relevance to the user. A user profile of the user may be retrieved as part of the process, in order to enhance the accuracy of the method, thereby enhancing the likelihood that the suggested alerts will be accepted by the user. One skilled in the art will recognize that the techniques of the present invention can be applied to many different methods of alert suggestion, and may apply to many different situations apart from the exemplary enterprise operation context mentioned previously.

System Architecture

According to various embodiments, the present invention can be implemented on any electronic device equipped to receive, store, and present information. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of receiving and/or processing user input. Accordingly, the following description is intended to illustrate various embodiments of the invention by way of example, rather than to limit the scope of the claimed invention.

Figure 1A:
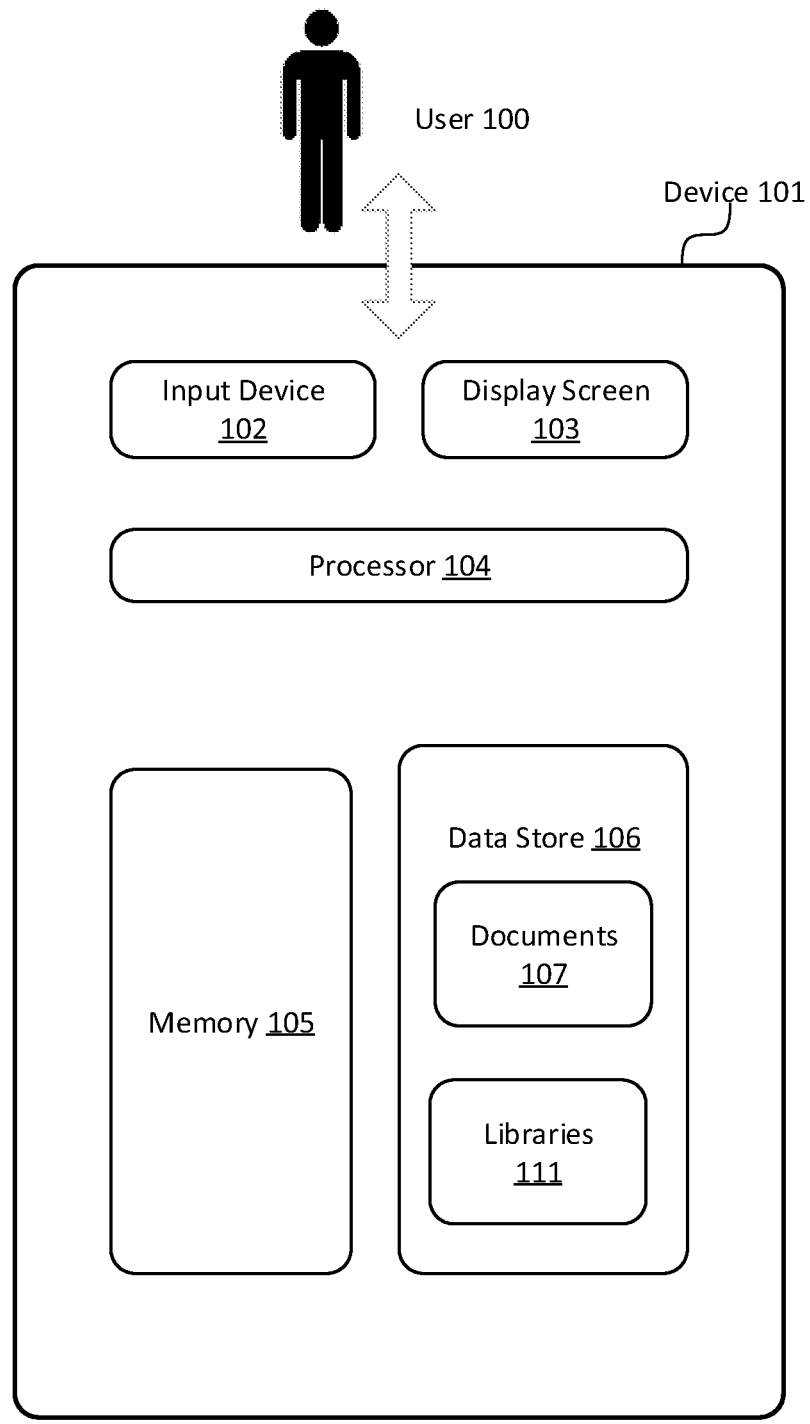
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include documents 107 and/or libraries 111 that can be utilized and/or displayed according to the techniques of the present invention, as described below. In another embodiment, documents 107 and/or libraries 111 can be stored elsewhere, and retrieved by device 101 when needed for presentation to user 100.

Display screen 103 can be any element that graphically displays documents 107, the libraries 111, and/or the results of steps performed on the documents 107 and/or the libraries 111 to provide data output incident to suggesting and/or setting alerts. Such data output may include, for example, one or more queries requesting confirmation of suggested alerts, one or more queries requesting information to complete suggested alerts, one or more notifications that a suggested alert has been set, and/or one or more notifications that the trigger condition for a set alert has been met.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Documents 107 and/or libraries 111 can be entered into such a detachable data store 106 from a source outside of device 101 and later displayed after data store 106 is connected to device 101. In another embodiment, data store 106 is fixed within device 101.

Figure 1B:
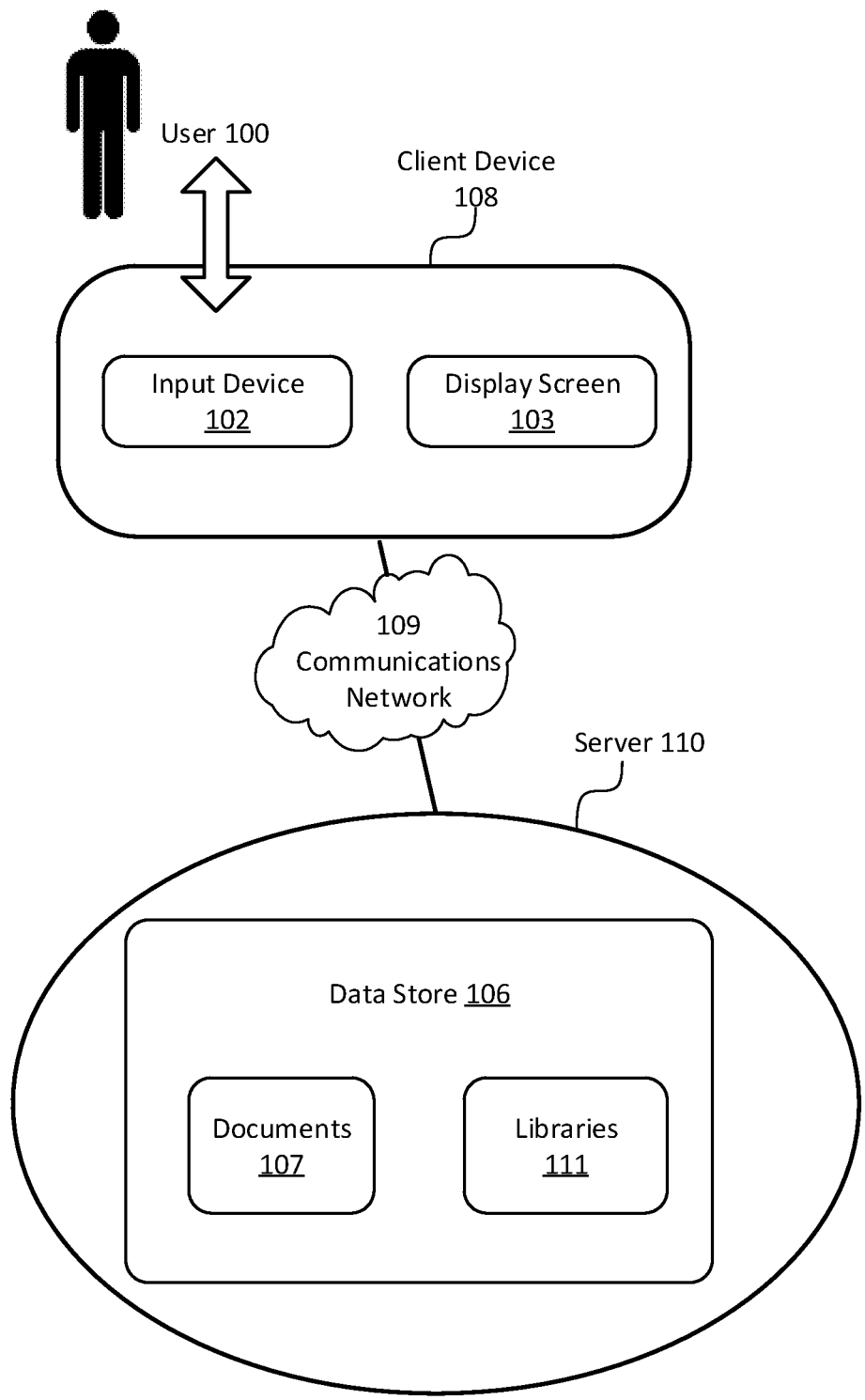
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Documents 107, data, and/or libraries 111 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106 for storing documents 107 and/or libraries 111. Server 110 may include additional components as needed for retrieving data and/or libraries 111 from data store 106 in response to requests from client device 108.

In at least one embodiment, documents 107 are organized into one or more well-ordered data sets, with one or more data entries in each set. Data store 106, however, can have any suitable structure. Accordingly, the particular organization of documents 107 within data store 106 need not resemble the form in which the documents 107 are displayed to user 100. In at least one embodiment, an identifying label is also stored along with each data entry, to be displayed along with each data entry.

In at least one embodiment, the libraries 111 are organized in a file system within data store 106. Appropriate indexing can be provided to associate particular documents with particular quantitative data elements, reports, other documents, and/or the like. The libraries 111 may include any of a wide variety of data structures known in the database arts.

Documents 107 can be retrieved from client-based or server-based data store 106, and/or from any other source. In at least one embodiment, input device 102 is configured to receive data entries from user 100, to be added to documents 107 held in data store 106. User 100 may provide such data entries via the hardware and software components described above according to means that are well known to those skilled in the art.

Display screen 103 can be any element that graphically displays documents 107, the libraries 111, and/or the results of steps performed on the information in the documents 107 and/or the libraries 111 to provide data output incident to suggesting and/or setting alerts. Such data output may include, for example, one or more queries requesting confirmation of suggested alerts, one or more queries requesting information to complete suggested alerts, one or more notifications that a suggested alert has been set, and/or one or more notifications that the trigger condition for a set alert has been met. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text or graphical form. Such data may include visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Furthermore, as described in more detail below, display screen 103 can selectively present a wide variety of data related to suggesting and/or setting alerts. In particular, as described herein, user 100 can provide input, such as a selection from a menu containing a variety of options, to determine the various characteristics of the information presented such as the type, scope, and format of the information to be displayed on display screen 103.

In one embodiment, the system can be implemented as software written in any suitable computer programming language, whether in a standalone or client/server architecture. Alternatively, it may be implemented and/or embedded in hardware.

Alert Structure

In general, an automated alert generally includes the following building blocks:

Trigger Condition: specifies what will trigger the alert; and
Notification Setting: specifies how the user will be notified that the trigger condition has been met.

A trigger condition may include a trigger source (i.e., the particular item that is to be measured), a trigger value (i.e., the value of that item that will trigger the alert), and an operator (i.e., whether the alert is triggered by a value greater than, less than, or equal to the trigger value). Trigger values may include numerical, textual, or other data. Operators may generally include "greater than," (">"), "less than," ("<"), and "equals" ("="), as well as combinations of these (such as "greater than or equal to").

The trigger source may include time-based triggers that simply trigger the alert when a certain time and/or date is reached. Alternatively, the trigger source may be quantitative, i.e., tied to a numerical value besides time. For example, in the context of operating an enterprise, a useful metric might relate to an aspect of company performance such as sales volume, profits, or the like. Thus, the trigger value may be a magnitude such that the alert is triggered when the metric in question exceeds or descends below the trigger value.

As another alternative, the trigger source need not be quantitative, but may instead be based on any other condition that can be effectively tracked by a computing system such as the device 101 of FIG. 1A and/or the client device 108 of FIG. 1B. For example, a trigger condition may be quantitative, such as the particular month in which an event occurred, or which political party holds a given political office. Thus, the trigger value may be based on textual, rather than numerical information.

Alternatively, the trigger condition may be binary (e.g., yes or no). For example, a trigger condition may be whether a competitor released a new product in a particular market segment or whether a user has viewed a certain document.

The notification defines how the user is to be notified of the alert. A wide variety of notification settings may be used. The notification setting for an alert may be independent of the trigger source and trigger value. A notification may take the form of a message transmitted to the user over the computing system, such as an e-mail message, pop-up notification, or audible message. Alternatively, a message may be initiated by the computing system used to set the alert, but then transmitted to the user via a different device such as a different computing system or a mobile device separate from the computing system.

Additionally or alternatively, a notification may include aspects that do not convey information about the alert, but rather simply notify the user that the alert has been triggered. Thus, an audible tone, screen flash or animation, or other tool may be used alone or in combination with a message to notify the user that the alert has been triggered.

As another alternative, the notification setting may include an activity that relates to the alert in some way. For example, if the alert relates to information tracked on a document, the alert may automatically retrieve the document for viewing by the user. If the alert relates to an event reported on in the news or other media, the alert may retrieve the related article or other information source for viewing by the user. As another example, the notification setting may include the automatic scheduling of a meeting, or transmission of a meeting request, to initiate an in-person or remote meeting among multiple individuals involved in the subject matter of the alert.

Conceptual Architecture—Automatic Alert Suggestion

In at least one embodiment, the system of the present invention enables automated suggestion of alerts with a high likelihood of relevance to the user. These alerts may be constructed by processing user inputs to determine which trigger sources and/or trigger values are most likely important to the user. The user may be queried to confirm that he or she does or does not want to set the suggested alerts. Then, the confirmed alerts may be set by the system, which may iteratively monitor data available to it to determine whether the trigger condition has been met.

Figure 2:
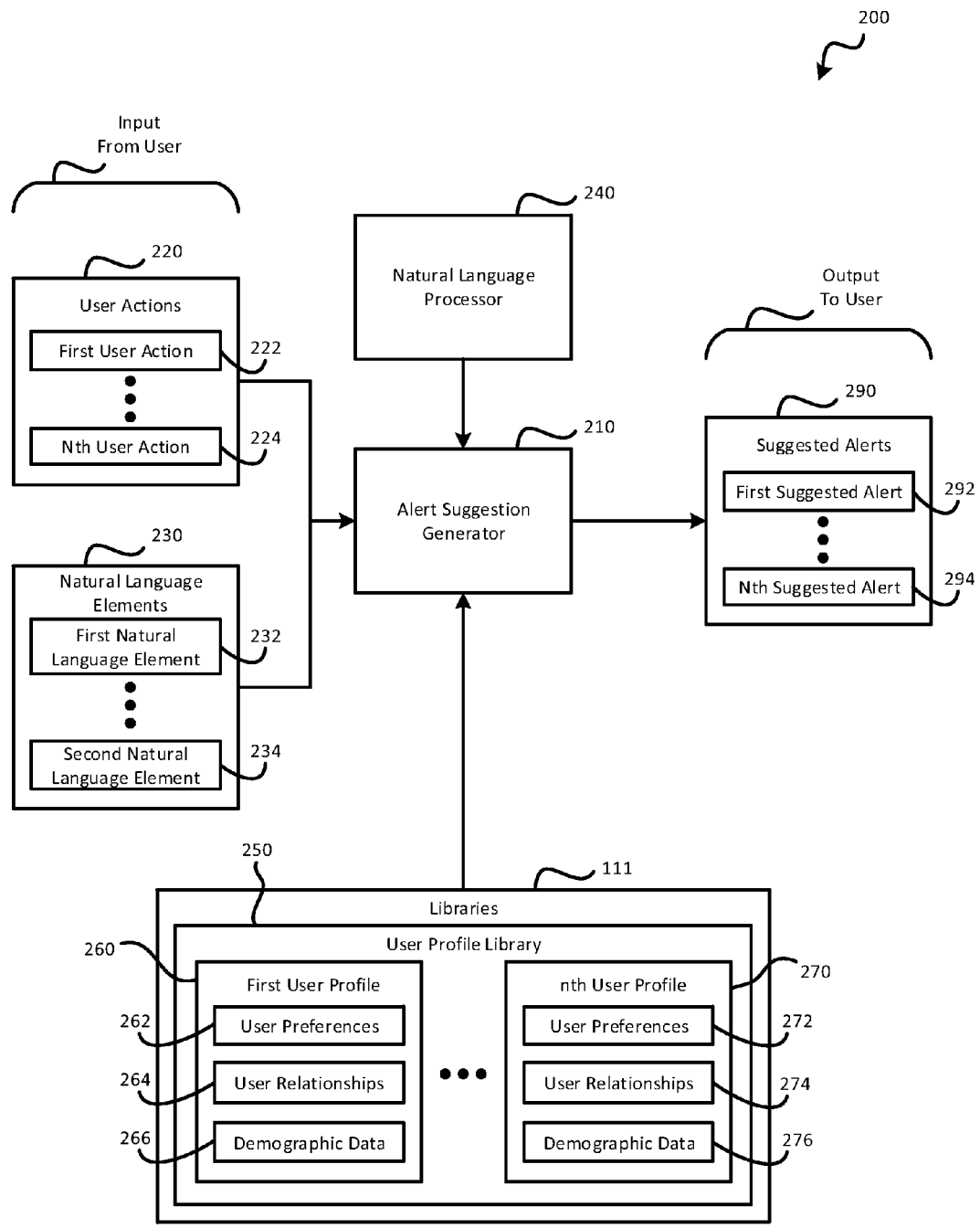
FIG. 2 is a block diagram depicting a system for carrying out alert suggestion, according to one embodiment of the present invention.

FIG. 2 is a block diagram depicting a system 200 for carrying out automatic alert suggestion, according to one embodiment of the present invention. As shown, the system 200 may have an alert suggestion generator 210 that receives various inputs from a user and/or a network to which the alert suggestion generator 210 is connected, such as the communications network 109 shown in FIG. 1B and, based on those inputs, generates the desired suggested alerts to the user.

More specifically, the system 200 may receive, from the user 100, one or more user inputs, which may be provided by the user 100 via the input device 102. The user inputs may include one or more user actions 220 and/or one or more natural language elements 230. The user actions 220 may include one or more user actions, or more specifically, a first user action 222 and optionally, a plurality of additional user actions up to an nth user action 224. Similarly, the natural language elements 230 may include one or more natural language elements, or more specifically, a first natural language element 232 and optionally, a plurality of additional natural language elements up to an nth natural language element 234.

The user actions 220 may include any of a variety of actions taken by the user 100 relative to the system 200. The user actions 220 need not be actions intended by the user 100 to initiate suggestion of alerts, and in at least one embodiment such actions 220 are performed by the user for other purposes and are not specifically for the purpose of setting alerts. It may therefore be beneficial for the system 200 to operate in the background as the user 100 performs other tasks. Thus, the system 200 may operate with little or no direct user input (i.e., input from the user 100 that is specifically for the purpose of setting alerts).

Some examples of user actions that could be user actions 220 that form user inputs to the alert suggestion generator 210 include, but are not limited to, the following:
- a visit to a web page, FTP site, or other Internet resource;
- a selection by the user indicating affinity for or affiliation with a piece of content available on the Internet (such as a selection to "like" or "follow" a user, a feed, or another resource);
- an action by the user to tag an existing conversation with key words;
- an action by the user associating measures with projects;
- a selection by the user to manually subscribe to existing alerts; and
- a selection by the user to retrieve and/or view a document from the device 101 and/or the client device 108, the Internet, or another network to which the device 101 and/or the client device 108 is connected such as the communications network 109.

In this application, the term "document" broadly refers to any piece of electronically-available information including a text document, picture, chart, graph, icon, or the like. Thus, making a selection to retrieve or view a document includes any action by which such an item is copied, displayed, printed, and/or viewed by the user 100. Documents involved in the user action 220 may come from the documents 107 referenced in FIG. 1A and FIG. 1B, or from other sources.

Some examples of natural language elements 230 that can be used as user inputs to the alert suggestion generator 210 may include the following:
- messages sent by the user 100 to other individuals, such as e-mails, instant messages, text messages and the like;
- comments made by the user 100 that are intended to be received by other individuals, such as comments on documents that will be viewed by the other individuals;
- comments made by the user 100 for the use of the user 100, such as notes to file, personal documents, and the like; and
- queries entered by the user in an attempt to search for, retrieve, and/or view information, such as search strings and the like.

In this application, the phrase "natural language" broadly refers to text that is entered by the user 100 in a form that is "natural" to the user and/or to other humans, i.e., would be used by the user to communicate with other individuals as opposed to a computing system. Thus, natural language may include one or more character strings that are not formatted in any particular way to facilitate parsing by a computer, but are rather more conversational for the user 100 and/or other humans.

The system 200 may receive the user actions 220 and/or the natural language elements 230 in a variety of ways, which may include monitoring the actions taken by the user 100 and/or text entered by the user 100 for actions and/or natural language elements that may be used as user inputs for the alert suggestion generator 210. This may be done, for example, by comparing the actions and/or natural language with certain criteria to determine whether the actions and/or natural language contain elements that may form the basis of an alert that is relevant to the user 100.

In some embodiments, actions and/or natural language provided by the user may be processed by the alert suggestion generator 210, and any alerts with a high likelihood of relevance to the user 100 may be suggested and/or set. In alternative embodiments, the alert suggestion generator 210 may apply filtering criteria to the actions and/or natural language so that only the actions and/or natural language that possesses certain elements will be received by the alert suggestion generator 210 as user actions 220 and/or natural language elements 230. Then, the actions and/or natural language elements 230 that meet the requirements of the filtering criteria may be processed in full by the alert suggestion generator 210 to suggest alerts.

The alert suggestion generator 210 may cooperate with a natural language processor 240 that facilitates analysis of the natural language elements 230. The natural language processor 240 may include a text parser, syntax-based rules, and/or other elements that facilitate the extraction of relevant alert components from the natural language elements 230.

The libraries 111 may contain a user profile library 250 that maintains one or more user profiles. As shown, the user profile library 250 may have a first user profile 260 and, optionally, a plurality of additional user profiles, up to an nth user profile 270. Each of the user profiles stored within the user profile library 250 may apply to an individual user of the device 101 and/or the client device 108, or of another device connected to the device 101.

The first user profile 260 may correspond to the user 100, and may include a variety of components such as user preferences 262 of the user 100, user relationships 264 of the user 100, and/or demographic data 266 of the user 100. Similarly, the nth user profile 270 may be for an nth user (not shown), and may include a variety of components such as user preferences 272 of the nth user, user relationships 274 of the nth user, and/or demographic data 276 of the nth user.

The user preferences 262 (and by extension, other user preferences stored within the user profile library 250) may include any selections made by the user 100, and may include preferences that relate to the operation of the system 200. For example, the user preferences 262 may include the types of alerts generally desired by the user 100, the types of user actions 220 and/or natural language elements 230 that can be received by the alert suggestion generator 210 as user input, the sensitivity level of the system 200 preferred by the user (i.e., the number of alerts to be suggested), global notification settings desired by the user 100 for all alerts, a selection of whether the system 200 should enable the user 100 to confirm suggested alerts, or simply set them automatically, and the like.

The user preferences 262 (and by extension, other user preferences stored within the user profile library 250) may also include preferences that are not related to system alerts. For example, the user preferences 262 may include settings defining how the user 100 views and/or retrieves documents and/or other resources, language settings, how the user communicates with other individuals, the ability of other individuals to view, modify, and/or comment on content generated by the user 100, the ability of the user 100 to view, modify, and/or comment on content generated by other individuals, and the like.

The system 200 may thus enable a wide variety of user-specific preferences that can be set by or for the user 100 and maintained in the user profile library 250. The user preferences 262, 272 may enable the operation of the system 200 to be fine-tuned to the specific needs and/or desires of each user.

The user relationships 264 (and by extension, other user relationships stored within the user profile library 250) may include information related to the individuals, entities, documents, and/or online resources to which the user 100 is related. Returning to the example of an enterprise, the user relationships 264 may include the position held by the user 100 within an enterprise. More specifically, the user relationships 264 may include the title, job description, reporting structure, tenure, department, security level, geographic location, or other information pertinent to the position held by the user 100 within the enterprise. The user relationships 264 may also include the individuals and/or entities that are on a list of contacts maintained by the user 100 and/or with whom the user 100 has conducted business. Further, the user relationship 264 may contain on-line connections such as contacts, individuals or resources visited, followed, and/or liked by the user, or the like.

In other contexts, the user relationship 264 may include other relationships. For example, in the example of political organizations, the user relationship 264 may include lists of people who support, contribute to, and/or vote for a given individual or platform. In the case of families, the user relationship 264 may include individuals that are part of a user's family. Those of skill in the art will recognize that the user relationships 264 may include a wide variety of other relationships, which may be matched to the context in which the user 100 uses the device 101 and/or the client device 108.

The demographic data 266 (and by extension, other demographic data stored within the user profile library 250) may include information such as the age, geographic location, marital status, race, religious affiliation, gender, political viewpoints, education level, nationality, years' experience in the workplace, degrees and/or certifications held, or any of a wide variety of demographic information that may assist the system 200 in generating alerts that have a high likelihood of relevance to the user 100.

The various user profiles stored within the user profile library 250 may include other components aside from those set forth above. This user-specific information may be explicitly set by each user or by other such as supervisors, system administrators, or the like. Alternatively, user-specific data for the various user profiles stored within the user profile library 250 may be inferred by the device 101 and/or the client device 108 based on actions taken by the user 100 in the course of interaction with the device 101 and/or the client device 108.

Once the alert suggestion generator 210 has received the user actions 220, the natural language elements 230, and/or the first user profile 260, as applicable, the alert suggestion generator 210 may use these data to generate one or more suggested alerts 290, each of which is likely to be relevant to the user 100. The suggested alerts 290 may include a first suggested alert 292, and may optionally include a plurality of additional suggested alerts, up to an nth suggested alert 294.

The alert suggestion generator 210 may generate the suggested alerts 290 using any of a variety of known methods. According to one example, the alert suggestion generator 210 may extract text from the natural language elements 230 that may act as trigger values. For example, the user 100 may make a comment with a date, quantitative value for a metric that can be tracked by the device 101 and/or the client device 108, or a qualitative condition that can be tracked by the device 101 and/or the client device 108. The alert suggestion generator 210 may then generate a suggested alert with such a date, quantitative value, or qualitative condition as the trigger value.

According to another example, the user 100 may make a comment that refers to a trigger source rather than a trigger value. For example, the comment may refer to times or dates in a more general sense, to a quantitative metric that can be tracked by the device 101 and/or the client device 108, or to a changing qualitative characteristic that can be tracked by the device 101 and/or the client device 108. The alert suggestion generator 210 may generate a suggested alert based on monitoring such times, dates, quantitative metrics, and/or qualitative characteristics. The appropriate trigger value may be obtained from other user actions 220 and/or natural language elements 230, or may be received directly from the user.

Additionally or alternatively, the alert suggestion generator 210 may extract data from the user actions 220 that either provides trigger sources and/or trigger values, or provides context for the natural language elements 230 received by the alert suggestion generator 210. For example, the user 100 may retrieve a document (such as one of the documents 107), or may visit, "like," or "follow" a web site or other on-line resource. The alert suggestion generator 210 may process language contained within the document or on-line resource to extract trigger sources and/or trigger values as set forth above in the discussion of processing the natural language elements 230. In the alternative, the alert suggestion generator 210 may extract or derive this information from other sources, such as a category and/or owner of the document or resource, other documents or resources connected to it, or the like.

Additionally or alternatively, rather than using the user actions 220 independently to obtain trigger sources and/or values, the alert suggestion generator 210 may utilize the user actions 220 to provide context for accompanying natural language elements 230. For example, the user 100 may retrieve and/or view a document, which action may be one of the user actions 220. The user 100 may then make a comment on or about the document, which may be received by the alert suggestion generator 210 as one of the natural language elements 230. The action of retrieving and/or viewing the document may be used in combination with the comments to enable the alert suggestion generator 210 to generate suggested alerts that more closely pertain to the needs of the user 100, when compared with the results obtained from relying on the comments, alone, for user input to the alert suggestion generation process.

The data from the first user profile 260 may be used in any of a wide variety of ways to facilitate the suggested alert generation process. If desired, the alert suggestion generator 210 may relate key areas recognized by the natural language processor 240 to key areas present within or recognized by analysis of the first user profile 260. These relationships may be ranked to create a list of areas of interest, in which alerts may beneficially be generated. The alert suggestion generator 210 may then suggest the alerts that are of greatest interest to the user 100 based on the current context in which the user 100 is operating in relation to the device 101 and/or the client device 108.

The alert suggestion generator 210 may use the user actions 220, the natural language elements 230, and/or the user profile library 250 in any of a wide variety of other ways aside from those set forth above to find appropriate trigger sources and/or trigger values for alerts. Any of a wide variety of algorithms may be used. Any algorithm known in the art for inferring user desires or intentions based on natural language text, user actions, and/or user profile information may be applied by the alert suggestion generator 210 within the scope of the present invention. Further examples of automated alert suggestion will be shown and described in connection with FIG. 4.

Automatic Alert Suggestion

Figure 3:
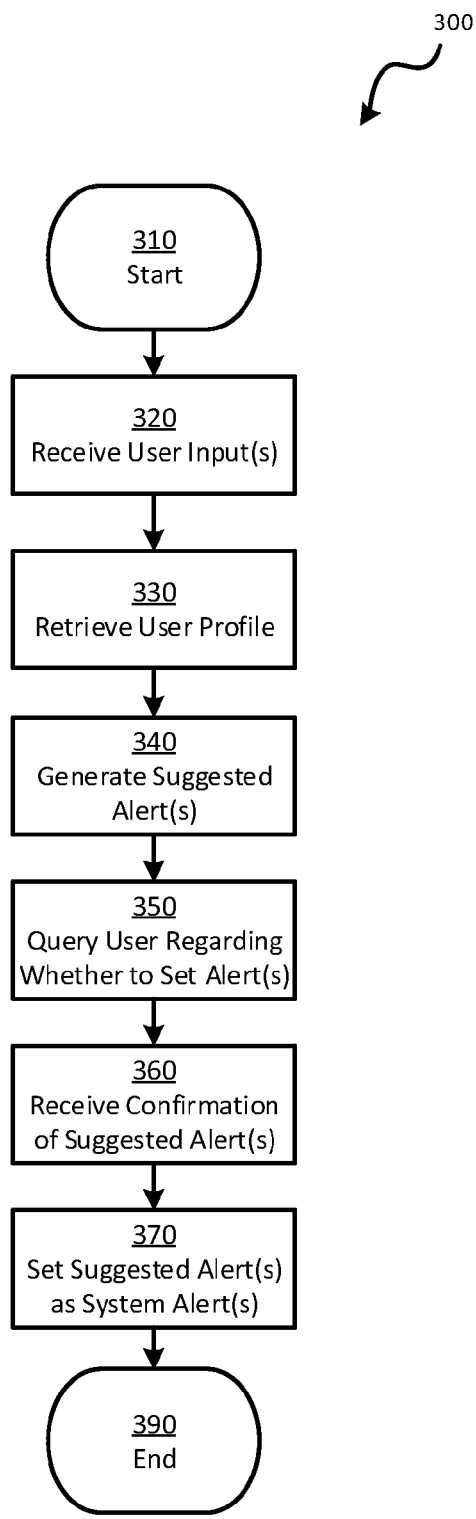
FIG. 3 is a flowchart depicting a method of alert suggestion and setting according to one embodiment of the present invention.

FIG. 3 is a flowchart depicting a method 300 of automatic alert suggestion and setting according to one embodiment of the present invention. The method 300 may be carried out, at least in part, by the system 200 as in FIG. 2, or with a differently-configured alert suggestion system. The method 300 may be performed in connection with input from a user; such a user may be a developer, customer, enterprise leader, sales representative for business intelligence services, or any other individual. FIG. 3 illustrates a series of steps in a certain order, but those of skill in the art will recognize that these steps may be re-ordered, omitted, replaced with other steps, or supplemented with additional steps, consistent with the spirit of the invention.

The method 300 may start 310 with a step 320 by which the alert suggestion generator 210 receives one or more user inputs. As shown in FIG. 2, the user inputs may include one or more user actions 220 and/or one or more natural language elements 230. As mentioned above, the user actions 220 need not be actions intended by the user 100 to initiate suggestion of alerts, and in at least one embodiment such actions 220 are performed by the user for other purposes and are not specifically for the purpose of setting alerts. The step 320 may entail a single event, or may be an ongoing process whereby user inputs are constantly received by the alert suggestion generator 210 for continual alert suggestion generation. If the step 320 is ongoing and/or repeated cyclically, the remaining steps in the method 300 may be repeated in a corresponding pattern.

Once the user inputs have been received, the method 300 may proceed to a step 330 in which the user profiles 260, 270 are received by the alert suggestion generator 210. The user profiles 260, 270 may be retrieved from the libraries 111, or more specifically, from the user profile library 250.

After retrieval of the user profiles 260, 270, the method 300 may proceed to a step 340 in which the alert suggestion generator 210 generates the suggested alerts 290. Methods whereby this may be carried out were set forth in the description of FIG. 2. The suggested alerts 290 that result from performance of the step 340 may be automatically set by the system 200. In the alternative, input from the user 100 may first be sought prior to setting the alerts.

Once one or more suggested alerts 290 have been generated, the method 300 may proceed to a step 350 in which the user is queried regarding whether to set the suggested alerts 290. This may entail transmitting a message to the user requesting confirmation of the suggested alerts 290 from the user 100. The user 100 may then accept (e.g., confirm) or decline the suggested alerts 290.

If desired, the user 100 may also be queried regarding the desired notification setting for each of the suggested alerts 290. Thus, the user 100 may indicate how he or she wishes to be notified that the trigger condition has been met. Additionally or alternatively, notification settings may be retrieved from the first user profile 260 for the user 100.

Then, assuming at least one of the suggested alerts 290 was confirmed by the user 100, the method 300 may proceed to a step 360, in which the system 200 receives confirmation from the user of the suggested alerts 290. Confirmation of the suggested alerts 290 may be carried out via any input method. In one embodiment, the user 100 user confirms the suggested alerts 290 to be set by clicking or otherwise selecting options from a displayed menu. The option to confirm may have text stating "confirm," "accept," "set alert," or the like. Similarly, selection of the notification setting for the alert may be made by making a corresponding menu selection and/or through the use of other input mechanisms known in the art.

Once confirmation of the suggested alerts 290 desired by the user 100 has been received, the method 300 may proceed to a step 370 in which the suggested alerts 290 confirmed by the user 100 are set as system alerts. This may be done by configuring the device 101 and/or the client device 108 to iteratively check the state of the trigger source of the alert. When the trigger source reaches, exceeds, or descends below the trigger value, the device 101 and/or the client device 108 may notify the user 100 of that occurrence according to the notification settings for the alert.

The method 300 may then end 390. Examples of performance of the method 300 will be shown and described in connection with FIG. 4.

Sample Output

Figure 4:
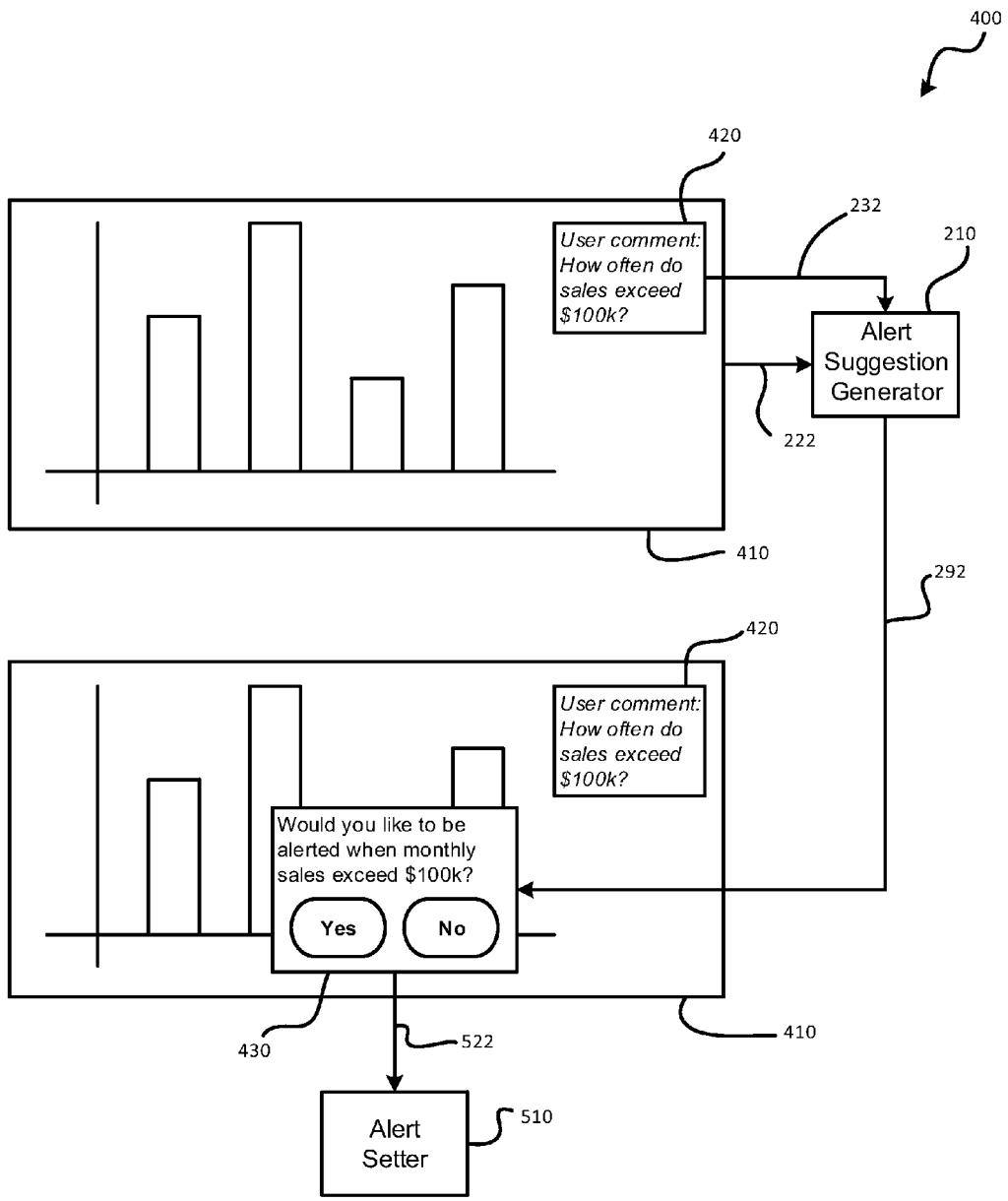
FIG. 4 is a block diagram depicting operation of alert suggestion and setting systems according to one embodiment of the present invention.

FIG. 4 is a block diagram 400 depicting operation of the method 300, as applied to an alert suggestion system such as the system 200 of FIG. 2. The user 100 may initially retrieve and view a document 410 that, in this case, contains a graph indicating sales volume over time, or more specifically, monthly sales. The user 100 may make a comment 420 related to the graph. The comment 420 may be embedded in, linked to, or in the same e-mail chain with, or otherwise connected to the document 410 so that the system 200 is able to recognize that the comment 420 is connected to the document 410.

The user action related to the document 410 (i.e., retrieval and/or viewing of the document 410) may be entered into the alert suggestion generator 210 as a first user action 222. The comment 420 may be entered into the alert suggestion generator 210 as a first natural language element 232. The alert suggestion generator 210 may then process the document 410 and the comment 420, and may use the document 410 as context to facilitate proper recognition of trigger sources and/or trigger values within the first natural language element 232.

More specifically, the alert suggestion generator 210 may recognize the value "$100k" as a possible trigger value, with the word "exceed" indicating that the trigger value relates to numbers higher than $100k. With the aid of the document 410, the alert suggestion generator 210 may also recognize that the trigger value relates to monthly sales, which define the trigger source for the $100k value. Thus, the alert suggestion generator 210 may generate suggested alerts 290 including a first suggested alert 292 related to whether monthly sales (the trigger source) exceed the $100k trigger value.

The alert suggestion generator 210 may query the user 100 regarding the first suggested alert 292 through the use of a notification such as a popup window 430 as illustrated in FIG. 4. The popup window 430 may contain text asking whether the user wishes to set the first suggested alert 292, and buttons (or other user interface elements) for the user 100 to confirm or decline to set the first suggested alert 292.

If the user 100 elects to set the first suggested alert 292, the corresponding first query response 522 may be conveyed to an alert setter 510, which may set the alert in the device 101 and/or the client device 108, as set forth in the description of the step 370 above. The device 101 and/or the client device 108 may iteratively monitor monthly sales, and when the trigger condition is met (i.e., monthly sales exceed $100k), the user 100 may be notified per the notification settings for the alert. Since the notification settings were not part of the popup window 430, it may be assumed that the notification settings were received from a previous query and/or retrieved as part of the first user profile 260 for the user 100.

FIG. 4 represents only one example; alerts may be generated, suggested, and/or set according to a wide variety of alternative methods. Some additional examples will be presented below; these are merely some of the ways in which the principles of the present invention may be carried out. Those of skill the art will recognize that the present invention can be used in connection with many other examples that are not specifically set forth herein.

According to one example, the present invention may be applied to a business intelligence system designed to help the user 100 obtain the data needed to effectively manage a business enterprise. The user 100 may query the device 101 and/or the client device 108, for example, with a natural language question. The alert suggestion generator 210 may receive the query and, together with information regarding the behavior of the user 100 (which may be stored in the first user profile 260), the computing system may automatically suggest an answer and/or the alert suggestion generator 210 may suggest creating an alert condition based on the question, relationships, and/or behavior of the user.

According to another example, the user 100 may provide input including a date element, which may be recognized by the alert suggestion generator 210 as a trigger value. The date may thus be used to set a value for a future date at which time the alert is to be triggered, and/or to specify a lifespan of the alert. Alternatively, the date and/or lifespan may be related to a measure presented in a report viewed by the user. Alternatively, the trigger condition may be unrelated to a particular date, but may be based on some other measurable quantity, external event, and/or the like. Alternatively, the trigger condition may be a combination of a date/time trigger and some other event.

According to another example, a user may ask, "Was this value this high last year?" in connection with a measure the user is viewing. The question may be presented as a message sent to another user, a posting to a website, blog, or other forum, or comment added to a web-based presentation of a graph of the measure. In response to such a question, a single alert or multiple alerts can be automatically generated, suggested, and/or set, with the measure as the trigger source and the value as the trigger value. Such an alert may inform the user whenever the measure exceeds the value. The alert may also contain a date-based trigger, for example to be triggered on an annual basis or on some other periodic basis. Alternatively, both alerts may be suggested.

As another example, the user 100 may ask, "Are Thursday's sales always the highest of the week?" Such a query may be received in the alert suggestion generator 210, which may recognize "sales" as the trigger source, and "higher than the other days of the week" as the trigger value. The alert suggestion generator 210 may generate, suggest, and/or set an alert that informs the user whenever Thursday's sales are (or are not) higher than other days.

As another example, a document available over the device 101 and/or the client device 108 may contain a chart that tracks monthly billings. The user 100 may visit this chart three times at two or more standard deviations away from the monthly goal. He or she may then visit the chart 24 times at one standard deviation away from the goal being reached. Finally, he or she may visit the chart at one standard deviation beyond the monthly goal. The alert suggestion generator 210 may receive the actions of the user 100 to visit the document and/or view the chart as user actions 220. These user actions 220 may be processed by the alert suggestion generator 210, without the aid of any natural language input, to automatically generate a suggested alert based on the frequency and/or timing of visits by the user 100 to the chart. For example, the suggested alert may be conveyed to the user with a query asking, "Would you like to be informed when monthly billings are 90% of the goal?"

As an example of alert generation without the need for natural language processing, a first user may be a member of the HR Benefits and Recruiting groups. A second user may also be a member of the HR Benefits group and may be responsible for a chart showing the total headcount in the company. The second user may share a badge, widget, link, or other identifier for the chart with the Recruiting group. The first user may then add the identifier to his or her "Favorites" page. These actions may be received by the alert suggestion generator 210 and used to infer that the first user would like to be notified of headcount changes (the trigger source) in excess of (the operation) a certain magnitude (the trigger value). The alert suggestion generator 210 may generate a suggested alert and present it to the first user in the form of a query asking: "Would you like to know when the headcount changes by 10%?"

As another example involving the use of natural language processing, a first user may directly ask a second user, "Do you anticipate having any Marketing expenses over $10,000 this quarter?" This question may be presented as a comment in or connected to a document, as an e-mail or instant message, or in another form that can be received by the alert suggestion generator 210. The alert suggestion generator 210 may infer from this comment that the second user may find it useful to know when marketing expenses per quarter (the trigger source) exceed (the operation) $10,000 (the trigger value). Thus, the alert suggestion generator 210 may generate a suggested alert and present the second user with a query asking, "Would you like to be informed when any marketing expense item exceeds $10,000?"

As an example, the user 100 may view a chart tracking sales quotas for the current month. He or she may make the following comment: "I can't believe that we're still 50% below quota this month." The alert suggestion generator 210 may receive this comment and infer that the user 100 would find it useful to know when sales (the trigger source) reach (the operation) 50% of quota (the trigger value). The alert suggestion generator 210 may then generate a suggested alert and present the user 100 with a query asking, "Would you like to be informed whenever sales are 50% of quota?"

As mentioned previously, the alert suggestion generator 210 may operate continuously to monitor user inputs to the associated computing system. Thus, whenever a user adds a comment associated with a measure, graph, document, web page, or the like, or in a conversation about a given topic, such an event may form an opportunity to assess the intent of a user. The comment may be directed, for example, to a topic, a system event, or to a group of users. Using natural language processing on the comment, and based on the context in which the comment was made, the system of the present invention can provide an effective mechanism for suggesting, creating, and/or configuring alerts in an intelligent and helpful manner.

According to other embodiments of the invention, if a complete alert is not recognized or found by the alert suggestion generator 210, a partially created alert may be presented to the user 100 for completion, confirmation, and/or rejection. This may be accomplished by querying the user for the information needed to complete the alert. This may require a higher level of user involvement than the suggestion of fully-formulated alerts, but may still be easier for the user 100 than creating the alert from scratch. For example, the system could suggest to a user when sales changes by a certain amount and leave the configuration of the date range to the user. A query may be used to elicit user input regarding the date range for the alert.

For example, User A may follow Users B, C, and D. User B may own the "Cash Balance" chart. User C may have an alert on the "Cash Balance" chart watching for changes of 5% or more, and may follow User B. User D may have the "Cash Balance" chart his or her "Favorites" page and may follow User B. The alert suggestion generator 210 may receive these actions as user actions 220, and may generate a suggested partially-created alert based on these relationships. The suggested partially-created alert may be conveyed to User A in the form of a query asking: "Would you like to know when the cash balance changes by more than <enter a value here> percent?" The user may then, in addition to confirming or rejecting the suggested partially-created alert, provide the information needed to provide a complete alert that can be set by the computing system.

Figure 5:
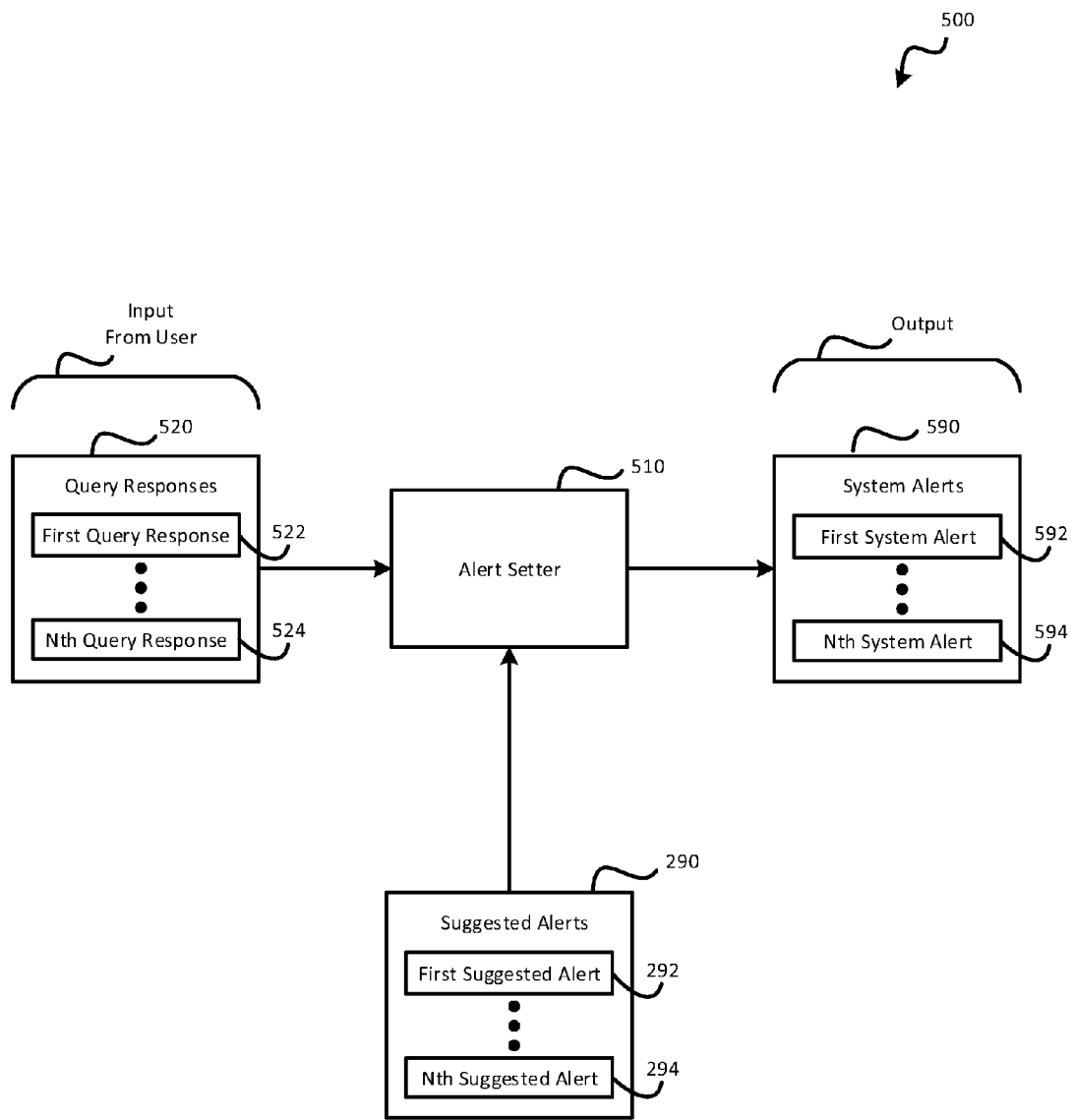
FIG. 5 is a block diagram depicting a system for carrying out alert setting, according to one embodiment of the present invention.
Figure 6:
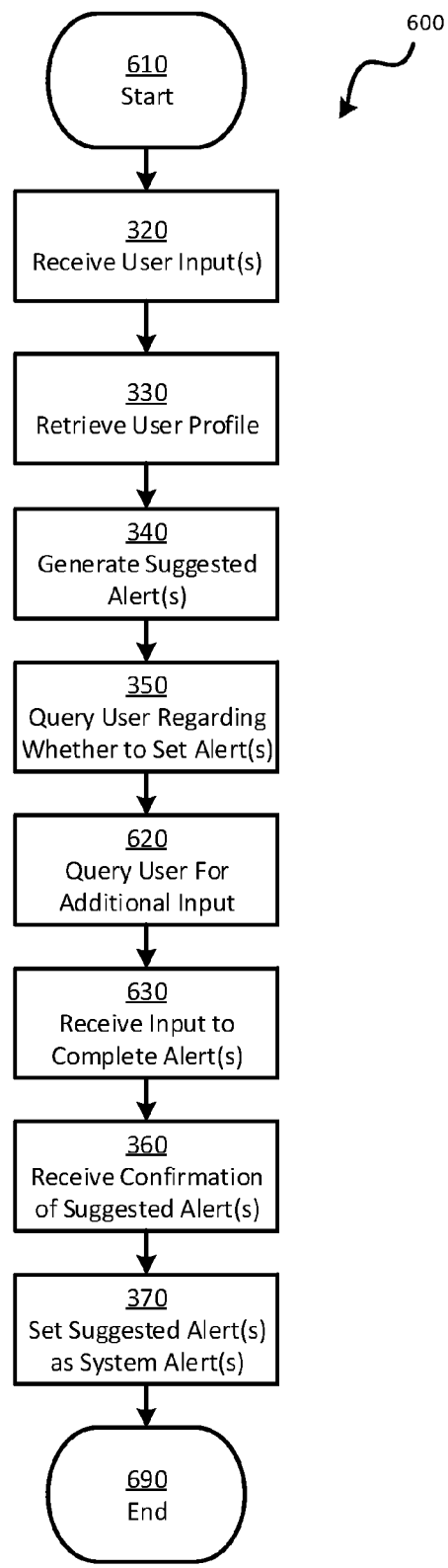
FIG. 6 is a flowchart depicting a method of alert suggestion and setting according to one embodiment of the present invention.

This may be accomplished in wide variety of ways. FIGS. 5 and 6 will illustrate alert setting systems and methods that may be used in conjunction with, or in place of, the system 200 of FIG. 2 and/or the method 300 of FIG. 3.

Conceptual Architecture—Partially-Created Alert Completion and Setting

As mentioned previously, the present invention may be used not only to suggest the alerts to be used, but also to set the alerts in the computing system used by the user 100 (i.e., the device 101 and/or the client device 108). By way of example, one system 500 for setting alerts will be shown and described in connection with FIG. 5, as follows.

FIG. 5 is a block diagram depicting a system 500 for setting alerts, according to one embodiment of the present invention. The system 500 may include an alert setter 510 that receives the suggested alerts 290 that were generated by the alert suggestion generator 210.

As mentioned previously, the alert suggestion generator 210 may query the user for information needed to complete any suggested partially-created alerts. Additionally, the alert suggestion generator 210 may query the user 100 for confirmation of both complete and partially-created suggested alerts. Thus, the alert setter 510 may also receive one or more query responses 520 from the user 100. The query responses 520 may include a first query response 522 that relates to the first suggested alert 292 and optionally, a plurality of additional query responses up to an nth query response 524 that relates to the nth suggested alert 294. If any of the suggested alerts 290 are complete, the associated entry in the query responses 520 may only include a confirmation or rejection of the complete suggested alerts 290. If any of the suggested alerts 290 are partially-created, the associated entry in the query responses 520 may include the confirmation or rejection in addition to the information needed to complete the partially-created alerts. Each of the query responses 520 may include multiple pieces of data besides the confirmation or rejection in the event that the corresponding one of the suggested alerts 290 needs more than one piece of information from the user 100 in order to provide a complete alert.

The alert setter 510 may receive the suggested alerts 290 and the query responses 520, and may then use the query responses 520 to complete the suggested alerts 290 in the case of any of the suggested alert 290 that were partially-created. The completed alerts may then be set by the computing system to define system alerts 590. The system alerts 590 may include a first system alert that is the same as or is derived from the first suggested alert 292. The system alerts 590 may also optionally include one or more additional system alerts up to an nth system alert 594 that is the same as or is derived from the nth suggested alert 294.

Once in place, each of the system alerts 590 may cause the computing system to continuously and/or iteratively determine whether the trigger condition for the system alert 592, 594 has been met. This may entail monitoring the corresponding trigger source and comparing (with the appropriate operation) the current value of the trigger source with the trigger value to determine whether the trigger condition has been met. Once the computing system determines that the trigger condition has been met, the user 100 may be notified of this via the applicable notification settings.

Partially-Created Alert Completion and Setting

The method 300 of FIG. 3 may be well-suited to situations in which all of the suggested alerts 290 generated by the alert suggestion generator 210 are complete. FIG. 6 provides a method with additional steps for situations in which at least some of the suggested alerts 290 generated by the alert suggestion generator 210 are only partially-created.

FIG. 6 is a flowchart depicting a method 600 of suggesting and setting alerts according to one embodiment of the present invention. The method 600 may be applied through the use of the system 200 of FIG. 2 and the system 500 of FIG. 5, or with alternative alert suggesting and/or setting systems.

The method 600 may include several of the same steps present in the method 300. Accordingly, steps that may be the same as or similar to counterpart steps in FIG. 3 are referenced with the same reference numbers. Thus, the method 600 may commence with the performance of the step 320, the step 330, and the step 340 substantially as set forth in the description of FIG. 3. One or more of the suggested alerts 290 generated in the step 340 may be only partially-created; hence, additional user input may be needed to complete these suggested alerts 290.

Once the user has been queried regarding whether to set the suggested alerts 290 in the step 350, the method 600 may proceed to a step 620 in which the user 100 is queried for the additional information needed to complete the partially-created members of the suggested alerts 290. This query may optionally be integrated with the query from step 350, requesting that the user 100 either confirm or reject the partially-generated suggested alert. Alternatively, the query for additional information may be separate from that used to request confirmation or rejection. Thus, the step 620 may occur before, after, or synchronously with the step 350. These queries may be provided to the user in text form, verbally, or in any other manner known in the art.

Once the alert suggestion generator 210 has queried the user 100 for the additional information needed, the method 600 may proceed to a step 630 in which the system 200 and/or the system 500 receives the user input needed to complete the partially-created alerts. This user input may be provided via menu selections, text entry, speech, and/or any other method known in the art.

The method 600 may then proceed to the step 360 in which the system 200 and/or the system 500 receives confirmation from the user 100 of at least some of the suggested alerts 290. As with the step 350 and the step 620, the step 630 and the step 360 may be performed in any order, or may be carried out synchronously. The step 360 and the step 630 may optionally be performed in the same order as the step 350 and the step 620. Thus, for example, if the step 350 is carried out prior to performance of the step 620, the step 360 may also be carried out prior to the step 630. If the step 350 and the step 620 were performed synchronously, the step 630 and the step 360 may also be performed synchronously.

After the system 200 and/or the system 500 has received confirmation of the suggested alerts 290, the method 600 may proceed to the step 370, in which the confirmed suggested alerts 290 are set as the system alerts 590. This may be done as described in connection with FIG. 3 and/or FIG. 5 above.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may include a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method comprising:
generating a suggested alert definition for a notification application, the notification application configured to maintain active alert definitions for a user, wherein an active alert definition of the notification application specifies data to monitor and an alert trigger condition to cause the notification application to generate a corresponding alert notification for the user, wherein providing the suggested alert definition comprises:
accessing a first data set of captured user interactions with a client computing device from electronic memory storage, wherein the first data set comprises information regarding user interaction with an application of the client computing device that is independent of the notification application, and
using a processor to analyze the first data set, and generate a suggested alert definition for the user based on the analysis of the first data set, the suggested alert definition specifying data to monitor and a trigger condition for suggested conversion to an active alert of the notification application; and
providing computer-readable code to display the suggested alert definition on a computing device display.

2. The method of claim 1, wherein the first data set of captured user interactions comprises information regarding natural language provided by the user, selected from a group consisting of:
a query issued to the computing system;
a message transmitted over the computing system to another individual; and
a comment made via the computing system in connection with a document viewable on the computing system.

3. The method of claim 1, wherein the first data set of captured user interactions comprises information regarding an action initiated by the user, selected from a group consisting of:
a selection by the user to visit to a web site;
a selection by the user to like content on a web site;
a selection by the user to follow content on a web site; and
a selection by the user to retrieve a document.

4. The method of claim 3, further comprising:
accessing a second data set of captured user interactions with a client computing device from electronic memory storage, wherein the second data set comprises natural language provided by the user; and
wherein the processor receives the second data set and analyzes the second data set, the analysis comprising processing the natural language within a context derived from the second data set.

5. The method of claim 1, further comprising:
prior to generating the suggested alert definition, retrieving a user profile, wherein generating the suggested alert definition comprises using the user profile in addition to analyzing the first data set.

6. The method of claim 5, wherein the captured user interactions pertain to an enterprise, wherein the user profile comprises information selected from a group consisting of:
a role of the user within the enterprise to which the first user input pertains;
a subset of the enterprise within which the user works;
an industry in which the enterprise functions;
a geographic location of the user;
a user preference established by the user;
a relationship of the user to another individual that works for the enterprise; and
a relationship of the user to another individual that does not work for the Enterprise.

7. The method of claim 1, wherein the trigger condition comprises a date, wherein generating the suggested alert definition comprises obtaining the date from the first data set.

8. The method of claim 1, wherein the trigger condition comprises a magnitude of a metric tracked via the computing system, wherein generating the suggested alert definition comprises obtaining the magnitude from the first data set.

9. The method of claim 1, further comprising:
prior to delivering the suggested alert definition to the notification application, querying a user regarding whether the user wants to convert the suggested alert definition into an active alert definition;
receiving a confirmation user input confirming that the user wants to convert the suggested alert definition into an active alert definition; and
delivering the suggested alert definition to the notification application for conversion to an active alert definition.

10. The method of claim 1, further comprising:
prior to delivering the suggested alert definition to the notification application, querying the user regarding the trigger condition and receiving a trigger condition user input establishing the trigger condition.

11. The method of claim 1, further comprising:
prior to delivering the suggested alert definition to the notification application, querying the user regarding notification setting and receiving a notification setting user input establishing a notification setting.

12. The method of claim 1, wherein the computer-readable code further comprises:
the notification application, wherein after receiving the suggested alert definition, the notification application iteratively monitors the specified data, and based on results of monitoring the specified data, determines that the trigger condition is met.

13. The method of claim 12, further comprising:
after determining that the trigger condition is met, notifying the user that the trigger condition is met in accordance with a notification setting.

14. A computer program product for automatically generating a suggested alert definition based on user interaction with a computing system, comprising:
a non-transitory computer-readable storage medium; and
computer-executable code, encoded on the non-transitory computer-readable storage medium of a computing system, configured to cause at least one processor to perform the steps of:
generating a suggested alert definition for a notification application, the notification application configured to maintain active alert definitions for a user, wherein an active alert definition of the notification application specifies data to monitor and an alert trigger condition to cause the notification application to generate a corresponding alert notification for the user, wherein providing the suggested alert definition comprises:
accessing a first data set of captured user interactions with a client computing device from electronic memory storage, wherein the first data set comprises information regarding user interaction with an application of the client computing device that is independent of the notification application;
analyzing the first data set, and generating a suggested alert definition related to the user interaction based on the analysis of the first data set, the suggested alert definition specifying data to monitor and a trigger condition for suggesting conversion to an active alert of the notification application; and
providing computer-readable code to display the suggested alert definition on a computing device display.

15. The computer program product of claim 14, wherein the first data set of captured user interactions comprises natural language provided by the user, selected from a group consisting of:
a query issued to the computing system;
a message transmitted over the computing system to another individual; and
a comment made via the computing system in connection with a document viewable on the computing system.

16. The computer program product of claim 14, wherein the first data set of captured user interactions comprises an action initiated by the user, selected from a group consisting of:
a selection by the user to visit to a web site;
a selection by the user to like content on a web site;
a selection by the user to follow content on a web site; and
a selection by the user to retrieve a document.

17. The computer program product of claim 16, wherein the computer-executable code is further configured to cause the processor to perform the step of:
accessing a second data set of captured user interactions with a client computing device from electronic memory storage, wherein the second data set comprises natural language provided by the user; and
wherein the processor receives the second data set and analyzes the second data set, the analysis comprising processing the natural language within a context derived from the second data set.

18. The computer program product of claim 14, wherein the computer-executable code is further configured to cause the processor perform the step of:
prior to generating the suggested alert definition, retrieving a user profile, wherein generating the suggested alert definition comprises using the user profile in addition to analyzing the first data set.

19. The computer program product of claim 14, wherein the computer-executable code is further configured to cause the processor to perform the steps of:
prior to delivering the suggested alert definition to the notification application, querying a user regarding whether the user wants to convert the suggested alert definition into an active alert definition;
receiving a confirmation user input confirming that the user wants to convert the suggested alert definition into an active alert definition; and
delivering the suggested alert definition to the notification application for conversion to an active alert definition.

20. The computer program product of claim 14, wherein the executable code further comprises the notification application and is further configured to cause the processor to perform the steps of:
after converting the suggested alert definition into an active alert definition, iteratively monitoring the specified data;
based on results of monitoring the data, determining that the trigger condition is met; and
after determining that the trigger condition is met, notifying the user that the trigger condition is met.

21. A computer-implemented method comprising:
generating a suggested alert definition for a notification application, the notification application configured to maintain active alert definitions for a user, wherein an active alert definition of the notification application specifies data to monitor and an alert trigger condition to cause the notification application to generate a corresponding alert notification for the user, wherein providing the suggested alert definition comprises:
providing computer-executable code for execution by a processor of a client computing device, the computer-executable code configured to cause the writing onto electronic memory storage of a first data set comprising background data pertaining to user interactions with the client computing device, wherein the background data comprises information regarding user interaction with an application of the client computing device that is independent of the notification application, accessing the first data set, and
using a processor to analyze the first data set, and generate a suggested alert definition for the user based on the analysis of the first data set, the suggested alert definition specifying data to monitor and a trigger condition for suggested conversion to an active alert of the notification application; and
providing computer-readable code to display the suggested alert definition on a computing device display.

22. The method of claim 21, wherein the first data set comprises information regarding natural language provided by the user, selected from a group consisting of:
a query issued to the computing system;
a message transmitted over the computing system to another individual; and
a comment made via the computing system in connection with a document viewable on the computing system.

23. The system method of claim 21, wherein the first data set of captured user interactions comprises information regarding an action initiated by the user, selected from a group consisting of:
a selection by the user to visit to a web site;
a selection by the user to like content on a web site;

a selection by the user to follow content on a web site; and
a selection by the user to retrieve a document.

24. The method of claim 23, further comprising:

access a second data set comprising background data pertaining to user interactions with the client computing device from electronic memory storage, wherein the second data set comprises natural language provided by the user; and wherein the processor receives the second data set and analyzes the second data set, the analysis comprising processing the natural language within a context derived from the second data set.

25. The method of claim 21, wherein the computer-executable code is further configured to cause a processor to:

prior to generating the suggested alert definition, retrieve a user profile, wherein generating the suggested alert definition comprises using the user profile in addition to analyzing the first data set.

26. The method of claim 21, wherein the computer-executable code is further configured to cause a processor to:

prior to delivering the suggested alert definition to the notification application, query a user regarding whether the user wants to convert the suggested alert definition into an active alert definition; and receive a confirmation user input confirming that the user wants to convert the suggested alert definition into an active alert definition; and deliver the suggested alert definition to the notification application for conversion to an active alert definition.

27. The method of claim 21, wherein the computer-executable code further comprises:

the notification application, wherein after receiving the suggested alert definition, the notification application iteratively monitors the specified data based on results of monitoring the specified data, determines that the trigger condition is met, and after determining that the trigger condition is met, notifies the user that the trigger condition is met in accordance with a notification setting.

* * * * *